(12) United States Patent
Korrie

(10) Patent No.: US 8,752,507 B2
(45) Date of Patent: Jun. 17, 2014

(54) STAY PUT DOG BOWL

(71) Applicant: David A. Korrie, Ashburn, VA (US)

(72) Inventor: David A. Korrie, Ashburn, VA (US)

(*) Notice: Subject to any disclaimer, the term of this patent is extended or adjusted under 35 U.S.C. 154(b) by 0 days.

(21) Appl. No.: 13/677,766

(22) Filed: Nov. 15, 2012

(65) Prior Publication Data

US 2013/0118412 A1    May 16, 2013

Related U.S. Application Data

(60) Provisional application No. 61/560,656, filed on Nov. 16, 2011.

(51) Int. Cl.
*A01K 5/00* (2006.01)

(52) U.S. Cl.
USPC ........................................................ 119/61.54

(58) Field of Classification Search
USPC ............................. 119/61.54, 61.5; D30/133
See application file for complete search history.

(56) References Cited

U.S. PATENT DOCUMENTS

| | | | | |
|---|---|---|---|---|
| 2,813,509 A | * | 11/1957 | Bruno ........................ | 119/51.01 |
| 3,148,636 A | * | 9/1964 | Blomquist et al. .......... | 108/26 |
| 4,907,539 A | * | 3/1990 | Abulhasan ................. | 119/61.54 |
| 5,509,231 A | * | 4/1996 | Marcoux ..................... | 47/58.1 R |
| 5,558,391 A | * | 9/1996 | Chavous ..................... | 297/153 |
| 6,216,605 B1 | * | 4/2001 | Chapman ..................... | 108/26 |
| 6,451,405 B1 | * | 9/2002 | Diemer ......................... | 428/100 |
| 7,040,252 B2 | * | 5/2006 | Wetterer et al. ............. | 119/61.54 |
| D523,186 S | * | 6/2006 | Northrop ..................... | D30/133 |
| 7,201,440 B2 | * | 4/2007 | Heck et al. ................... | 297/148 |
| D550,407 S | * | 9/2007 | Spiwak ....................... | D30/129 |
| D553,305 S | * | 10/2007 | Willinger et al. ............ | D30/133 |
| D563,739 S | * | 3/2008 | Shamoon ..................... | D7/698 |
| D583,111 S | * | 12/2008 | Molina-Justin ............. | D30/129 |
| 7,475,937 B2 | * | 1/2009 | McGrew et al. ............. | 297/148 |
| 8,132,358 B1 | * | 3/2012 | Wells ............................. | 47/21.1 |
| 2003/0017300 A1 | * | 1/2003 | Clay ............................. | 428/100 |
| 2005/0039607 A1 | * | 2/2005 | Comfield ....................... | 99/324 |

* cited by examiner

*Primary Examiner* — Yvonne Abbott
(74) *Attorney, Agent, or Firm* — Whitham Curtis Christofferson & Cook, PC

(57) ABSTRACT

A nourishment station for a pet, such as a dog or cat, includes a bowl and a mat or pad combination where the bowl fits within an opening of the mat or pad. A flange at the bottom of the bowl secures the bowl to the mat or pad and allows the bowl to be held against a floor or other surface by the mat or pad. The mat or pad is sized such that the pet must stand on the mat or pad when approaching the bowl such that the pet's own weight prevents the pet from being able to overturn or move the bowl.

6 Claims, 6 Drawing Sheets

STAY PUT DOG BOWL

CROSS-REFERENCE TO RELATED APPLICATIONS

This applications claims priority U.S. Provisional Patent Application Ser. No. 61/560,656 filed on Nov. 15, 2011, and the complete contents thereof is herein incorporated by reference.

FIELD OF THE INVENTION

The invention pertains to preventing an animal, such as a pet dog or pet cat, from pushing a bowl containing food or water around a room and/or tipping over the bowl.

BACKGROUND

Pets can make a mess of the house when they push or tip over their water bowl (dish) or food bowl. With water spilled from the bowl, there is a risk of slipping to the pet owner or his or her guests, and there is a risk of damage to the flooring (especially in the case of wood flooring). Previously, there have been a variety of ways to address this problem. For example, the dish may be weighted making it harder for the animal to push or tip the dish. This approach has the problem that the dish might be uncomfortably heavy for the pet owner to bend down and pick up the dish, and may also present an injury problem or floor damage problem if the dish is dropped by the pet owner. In addition, for some larger and/or more powerful dogs, the weight used in the bowl is not sufficient to prevent moving and tipping. As another example, the dish may include a sticky surface or other treatment on the bottom. This approach relies on a frictional engagement with the floor which may cause some damage to the floor and/or may make the bowl difficult for the pet owner to retrieve from the floor when he or she wants to fill the bowl.

There is a need for different and superior approaches to preventing spillage from a pet's dish.

SUMMARY

An exemplary embodiment of the invention is to provide a combination of a mat or pad together with a bowl, where the pet's own weight is used to prevent the pet from moving and/or tipping over the bowl.

According to the invention, a nourishment station for an animal which is used to provide food or water or both simultaneously includes a combination of a bowl and a mat or pad. The mat or pad has an opening. The outer periphery of the bowl fits through the opening, and a flange portion at the bottom of the bowl does not fit through the opening. Thus, the mat or pad holds the bowl down on the floor, rug, or other surface with the flange being secured by the edge region at the opening. The mat or pad is specifically sized such that the pet must step on mat or pad to reach the bowl. In this way, the pet's own weight effectively prevents the pet from moving the bowl.

DESCRIPTION OF THE DRAWING FIGURES

DETAILED DESCRIPTION

Figure 1:
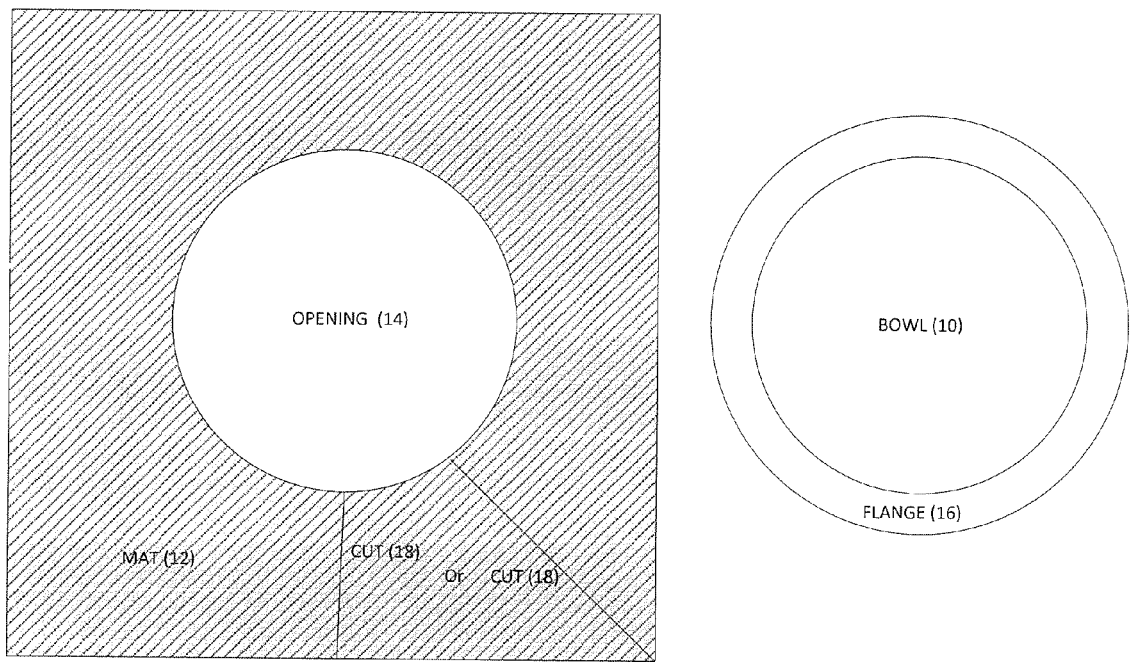
FIG. 1 is a plan view showing an exemplary bowl (dish) and mat (pad) used for the nourishment station.
Figure 1B:
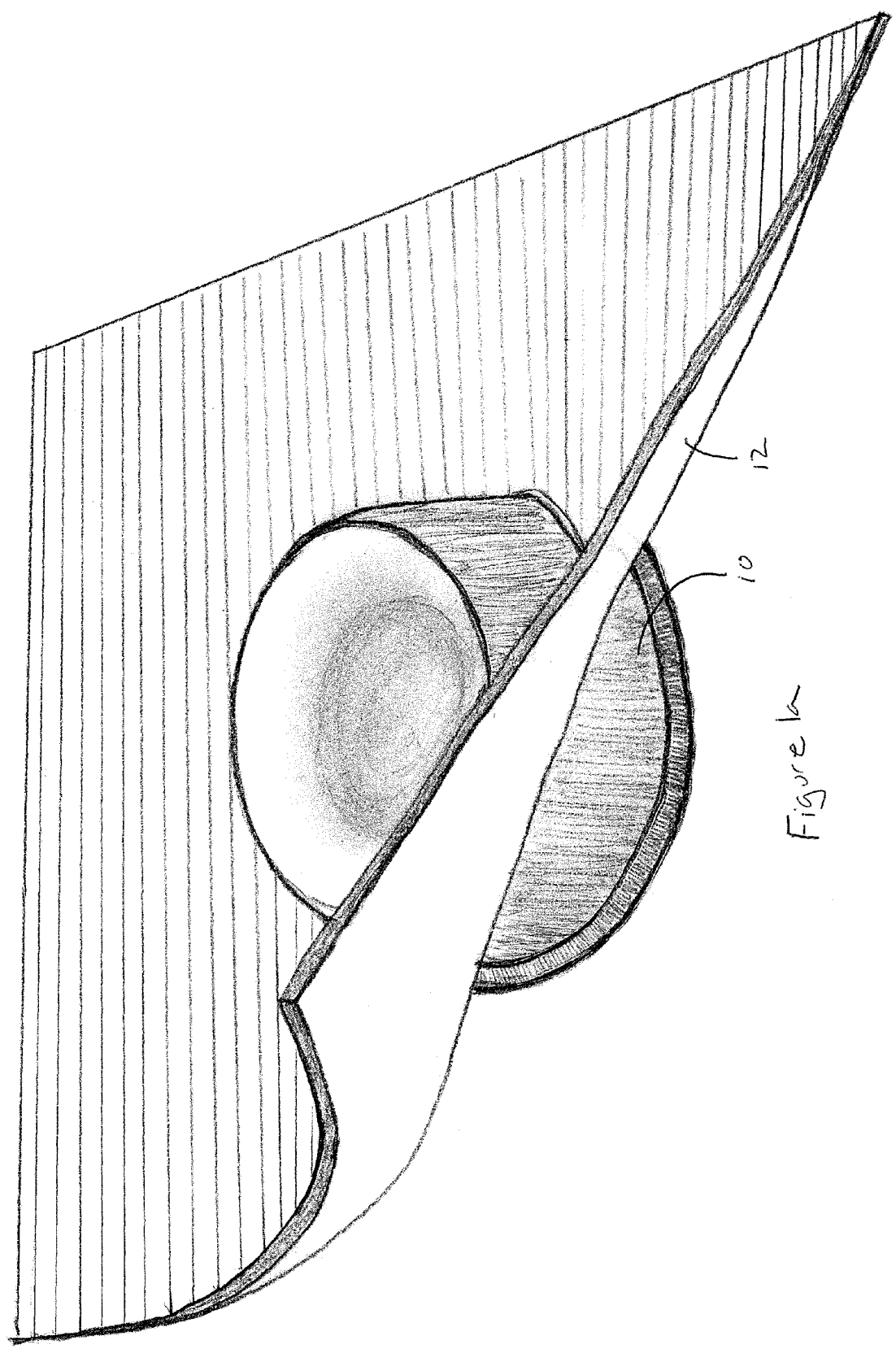
FIG. 1a is an isometric view showing the mat being installed on the bowl of FIG. 1.

FIG. 1 shows an exemplary embodiment of the invention where a nourishment station for an animal (e.g., dog or cat or other animal) includes a combination of a bowl 10 and a mat 12. The mat 12 has an opening 14 through which the bowl 10 fits. A flange 16 at the bottom of the bowl 10 does not pass through the opening 14 and is, instead, held to the floor or other surface by the mat 12 via the edge of the opening 14 resting on the flange 16.

FIG. 1a shows the mat 12 being installed on the bowl 10 as illustrated in FIG. 1.

Figure 2:
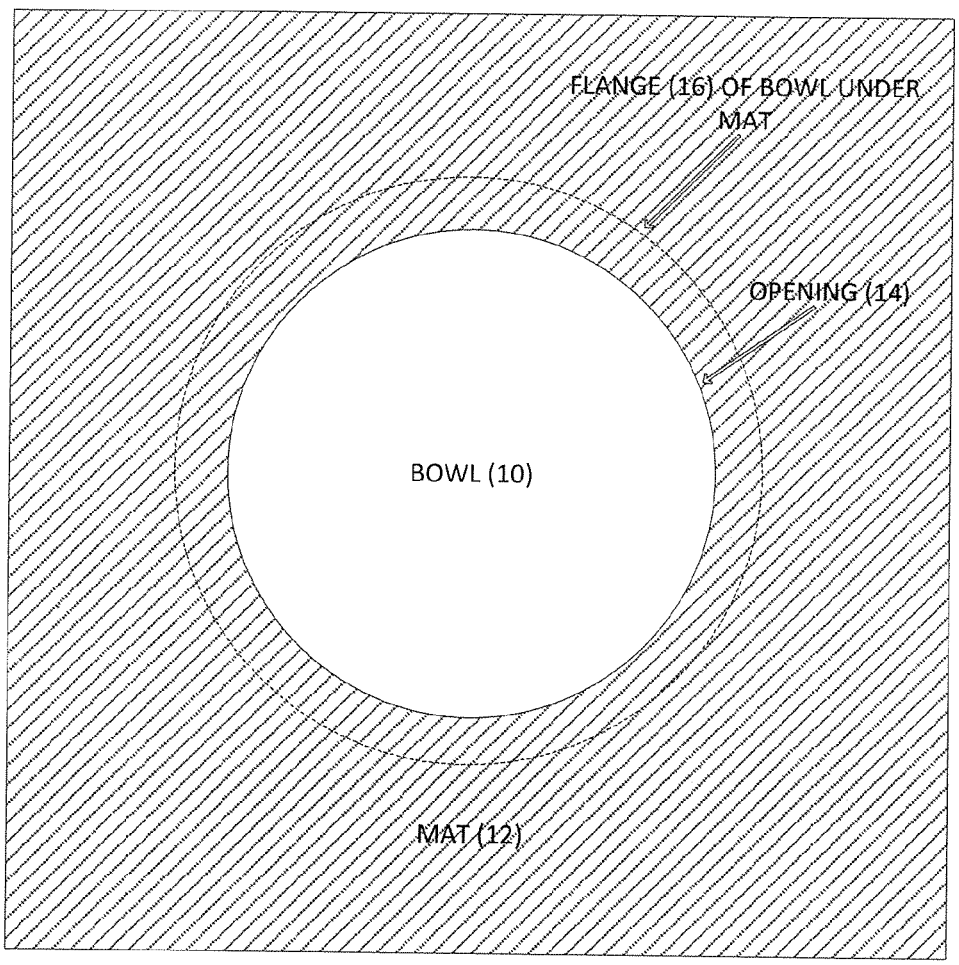
FIG. 2 is a plan view showing the exemplary bowl and mat of FIG. 1 fitted together.

FIG. 2 shows the bowl 10 protruding through the opening 14 of the mat 12, with the flange 16 (illustrated by dashed lines) being secured to the floor by the edge of the mat 12 overlapping the flange.

The mat 12 can be constructed with an opening 14 such that to assemble the nourishment station, the owner of the animal will slide the bowl through the opening from the bottom of the mat or pressing the mat over the bowl from the top so that it slides down the bowl and rests on the flange 16. Alternatively, as illustrated in FIG. 1, the mat 12 could have a cut 18 extending from one edge that will allow the owner to secure the bowl by sliding it through the cut or folding different portions of the mat on either side of the bowl or using the same procedure to install the mat as if the cut 18 were not present (see FIG. 1a). It is noted that the cut 18, if a cut is to be included, can be anywhere on the mat, and FIG. 1 shows examples where the cut extends to a side or extends to a corner.

Figure 3:
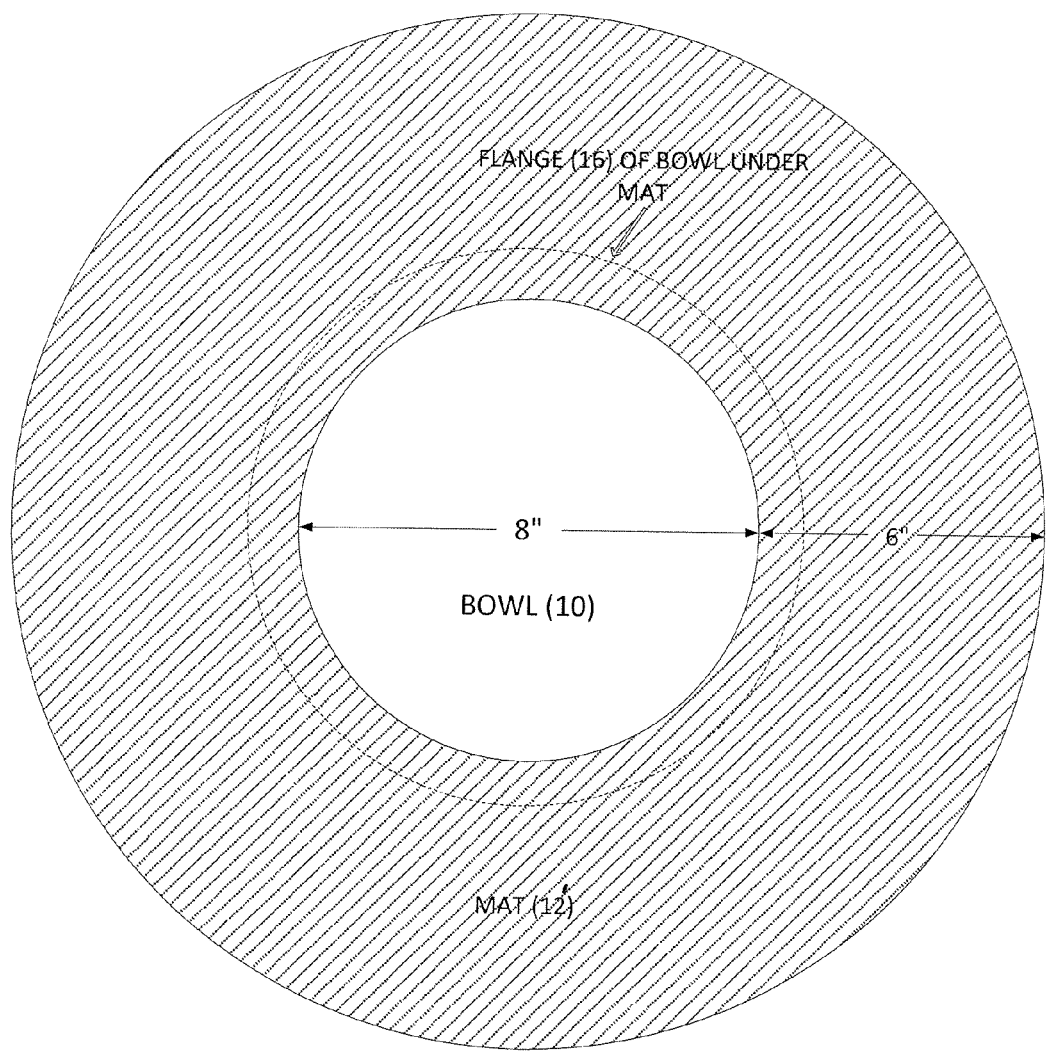
FIG. 3 is a schematic drawing of another embodiment of a bowl and mat.

FIGS. 1 and 2 illustrate a square mat and a round bowl. However, this need not be the case. FIG. 3, for example, shows a round bowl 10 (which may, for example, be 8" in diameter) which fits in an opening of a round mat 12' (which may, for example, be 20" in diameter). The mat could take any desired shape. The mat could be of any desired material including fiber (e.g., cocofiber), rubber, polypropylene, bamboo weave, etc. Suitable materials are those which are used to make doormats and similar devices. The base of the mat could include a rubberized surface for contacting the floor. The mat should have a thickness and weight sufficient to remain flat and hold down the bowl when it is placed in the opening. That is the mat should not be of a material which itself would roll up into a bunch when contacted by the paws of a pet. Furthermore, while FIGS. 1-3 show the opening in the mat being centrally located. However, it should be understood that in some configurations the opening could be offset from the center.

In the practice of the invention, the bowl could be round as shown in FIGS. 1-3, or it could be polygonal. Moreover, the bowl need not only have one cavity centrally located for containing water or food. Rather, the bowl could be rectangular or oblong or another suitable shape and could have a plurality of cavities (e.g., one for water and one for food). The bowl can be constructed of metal (e.g., steel or aluminum) or it can be constructed of plastic or other suitable materials.

The flange 16 extends from the bottom of the bowl in the same plane as the bottom of the bowl to allow the bowl to rest comfortably on a floor or other surface. While FIGS. 1-3 show the flange 16 integral with the bowl, it could be a separately attachable member. Furthermore, while FIGS. 1-3 show the flange encircling the entirety of the bowl, in some configurations the flange could comprise a series of separate projections which extend from different locations on the edge of the bottom of the bowl from the outer periphery of the bowl. The flange should have sufficient rigidity to retain the bowl within the hole of the mat. In addition, preferably the thickness of the flange should be small enough that the mat is not noticably deflected upwards along the sidewall of the outer periphery of the bowl.

A key feature of the invention is that the mat must be of a size which requires the animal to stand on the mat or have at least one foot placed on the mat when extending towards the bowl. With this design, the animal's own weight will prevent the animal from pushing or tipping over the bowl. With the animal standing or having a foot on the mat, the bowl cannot be pushed by the animal. Further, since the bowl is held down by the mat engaging the flange, the animal cannot turn over the bowl. In the configuration described herein, the bowl can only be removed from the mat by lifting the mat from the bowl which is an act that would not be easily accomplished by, for example, a dog or cat.

Figure 4:
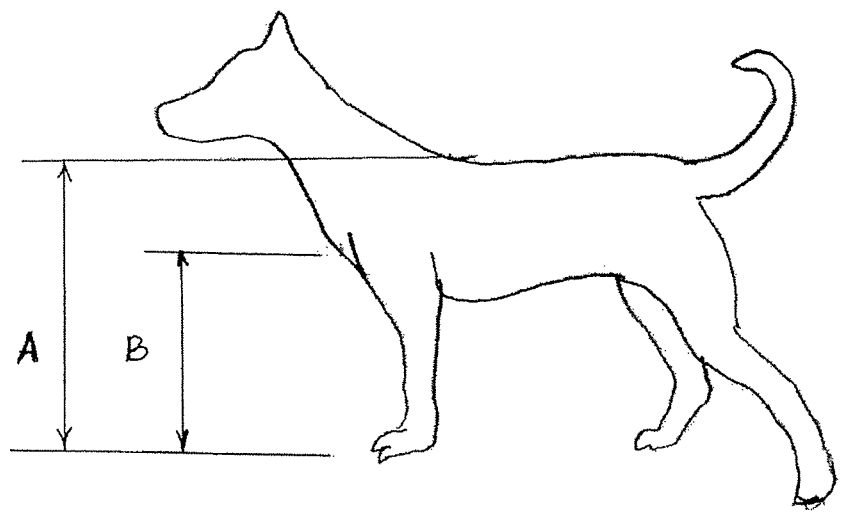
FIG. 4 show illustrations of dogs highlighting their head and shoulders.
Figure 4:
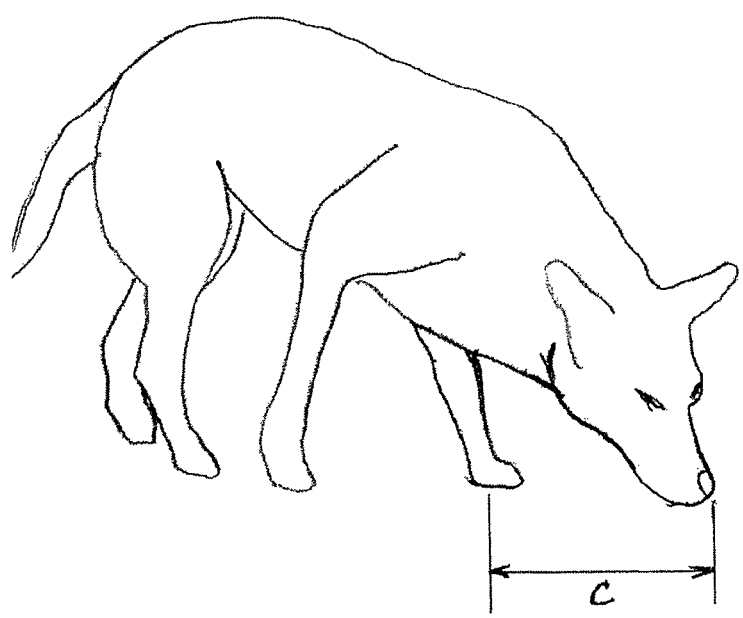

FIG. 4 illustrates heights A and B and distances C relative to a dog. Height A is the height of a dog's shoulders. Height B is the height of the dog's legs (where the leg meets the body; the "arm-pit"). Distance C is the "pushing distance". Most dogs, when bending their head down to the ground, will place one front paw on the ground ahead of the other for balance. Dogs rarely place both front paws on the same plane perpendicular to their body when bending their head down.

Measurements were taken on dogs ranging from 15 to 145 pounds. The measurements were used to identify an appropriate mat size which will work for various body type and sizes of dogs. The variable of most importance is pushing distance C. It was found that with dogs from 15 to 145 pounds, C ranged from 6 to 13 inches. When comparing the pushing distance C to the other measurements taken for each dog, it was found that the measurement measurement most consistently related to the pushing distance was the height of the dog at the shoulder (variable A). The pushing distance C was found to be generally between four tenths of the height at the shoulder A. Thus, the "average" dog will lean forward nearly half of his or her shoulder height when lowering his or her nose to the ground. With a very short dog with a long body, their may be a greater counter weight to balance against its forward reach and this may yield a pushing distance greater than one half of its weight. Similarly, dogs with very long necks or with most of their weight in the upper front part of their bodies (e.g., bulldogs) will have, respectively, more or less than the 0.4 to 0.5 ratio in pushing distance to height.

Figure 5:
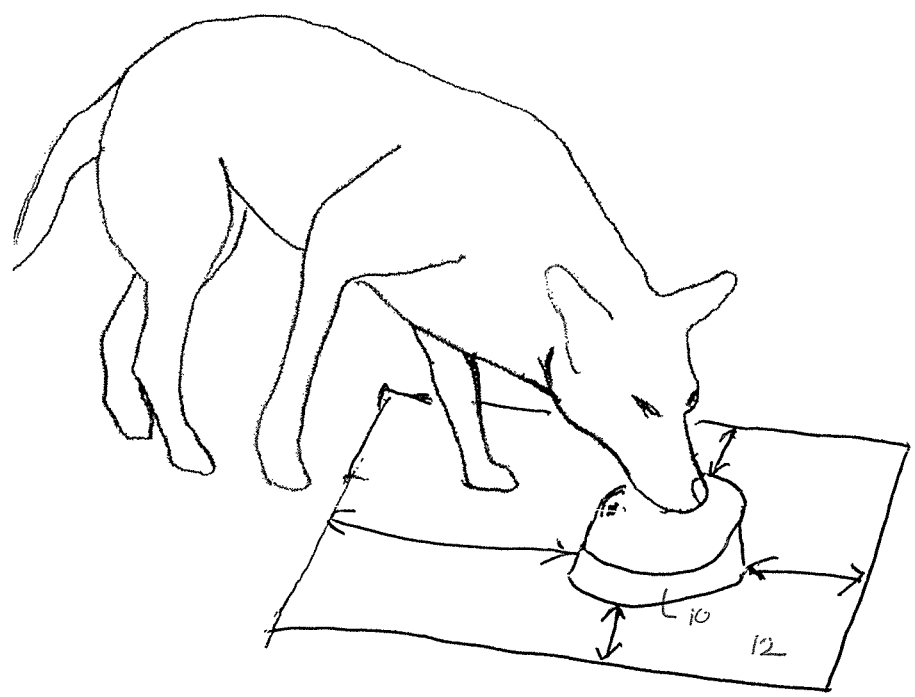
FIG. 5 is an illustration showing a dog stepping on a mat to reach a bowl.

From the measurements, the mat (pad) should extend at least six inches radially in every direction from said outer periphery of said bowl. In some configurations, the mat (pad) will extend 10 or 12 or more inches radially in every direction from said outer periphery of said bowl. FIG. 5 shows a pet having his or her forward paw on mat 12 while retrieving nourishment (water or food) from bowl 10. By "radially in every direction from said outer periphery", I mean that there must be at least six inches (or 10 or 12 inches) of pad on all sides of the bowl If there is only, for example, two inches on one side, then the animal might be able to approach to closely without stepping on the mat and would be able to push the bowl and mat with their nose since no weight would be being applied to the mat. The requirement of "at least six inches in every direction" (or 10 or 12 inches), I do not mean that the bowl must be centrally positioned and that there must be an equal amount of mat extending on all sides. Contrasting the rectangular mat of FIGS. 1 and 2 with the circular mat of FIG. 3 demonstrates that this is not the case. Rather, the bowl could be placed in any location including offset locations so long as the animal must step on the mat no matter what direction he approaches the bowl from. FIG. 5 is intended to illustrate this by having four different sized double headed arrows on the mat where each of the arrows is at least six inches in length.

The requirement of having the mat extend every direction by six or twelve or more inches from the outer periphery of the bowl should be equally applicable to cats and other pets.

The invention has been described in terms of several exemplary embodiments. Those of skill in the art will recognized that the invention can be practiced with modification within the spirit and scope of the appended claims.

The invention claimed is:

1. A nourishment station for an animal, comprising:
   a bowl having at least one cavity for containing food or water, a top, a bottom, and an outer periphery which is widest at said bottom of said bowl, wherein said at least one cavity extends from said top towards said bottom;
   a flange connected to, integrally formed with, or attachable to said bottom of said bowl at said outer periphery, said flange extends away from said bottom of said bowl from said outer periphery in a plane which includes said bottom of said bowl;
   a mat or pad having a top and a bottom and an opening which passes through said mat or pad from said top to said bottom such that both said top and bottom of said mat or pad is open at said opening, wherein said opening is sized to fit said outer periphery of said bowl but which is smaller than said flange, wherein
   said bowl fits within said opening of said mat or pad,
   said flange fits under said bottom of said mat or pad such that said mat holds said bowl down at said flange, and
   said mat or pad extends at least six inches radially in every direction from said outer periphery of said bowl.

2. The nourishment station of claim 1 where in said flange encircles said outer periphery of said bowl.

3. The nourishment station of claim 1 wherein said outer periphery of said bowl is round.

4. The nourishment station of claim 1 wherein said mat or pad has a rubber material on a bottom surface.

5. The nourishment station of claim 1 wherein said mat or pad extends at least twelve inches radially in every direction from said outer periphery of said bowl.

6. A nourishment station for an animal, comprising:
   a bowl having at least one cavity for containing food or water, a top, a bottom, and an outer periphery which is widest at said bottom of said bowl, wherein said at least one cavity extends from said top towards said bottom;
   a flange connected to, integrally formed with, or attachable to said bottom of said bowl at said outer periphery, said flange extends away from said bottom of said bowl from said outer periphery in a plane which includes said bottom of said bowl;
   a mat or pad having a top and a bottom and an opening which passes through said mat or pad from said top to said bottom such that said top and bottom of said mat or pad is open at said opening, wherein said opening is sized to fit said outer periphery of said bowl but which is smaller than said flange, wherein
   said bowl fits within said opening of said mat or pad,
   said flange fits under said bottom of said mat or pad such that said mat holds said bowl down at said flange, and
   said mat or pad extends at least six inches radially in every direction from said outer periphery of said bowl, wherein said mat or pad includes a cut from one edge that extends to said opening.

* * * * *